United States Patent Office 3,428,734
Patented Feb. 18, 1969

3,428,734
SULFITE NEMATOCIDES
Bogislav von Schmeling, Hamden, and Rupert A. Covey,
Wolcott, Conn., assignors to Uniroyal, Inc., New York,
N.Y., a corporation of New Jersey
No Drawing. Continuation-in-part of application Ser. No.
532,085, Mar. 7, 1966. This application June 2, 1967,
Ser. No. 643,056
U.S. Cl. 424—303    12 Claims
Int. Cl. A01n 9/14; C07c 143/00

This invention relates to sulfite diesters and particularly to their use for the control of parasitic nematodes. This application is a continuation-in-part of our prior copending U.S. application Ser. No. 532,085, filed Mar. 7, 1966, now abandoned.

The control of nematodes is a difficult and complex problem of great economic importance in agriculture, horticulture and forestry. See, U.S. Patent 3,112,244 for detailed discussion of this problem. Several nematocidal chemicals are disclosed in the patent literature, e.g., U.S. Patent 2,909,457 teaches thioethers, such as phenyl sulfides; U.S. Patent 2,938,831 suggests dialkyl pyrazinyl phosphorothioates; U.S. Patent 2,957,800 shows amides of dihalopropionic acids; U.S. Patent 3,113,908 teaches methyl isothiocyanates; U.S. Patent 3,086,907 illustrates five-membered heterocyclic lactones and lactams; and U.S. Patent 3,112,244 teaches phosphorothioates and phosphorothioites.

In accordance with this invention a new class of nematocides has been discoverd which are effective in controlling such parasitic nematodes as Meloidogyne spp. and saprophytic forms such as *Panagrellus redivivus*.

These nematocides are considerably less costly and less phytotoxic than those previously known.

They have the generic formula:

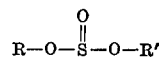

where R is an alkynyl group having from 3 to 12 carbon atoms, or a substituted alkynyl group wherein from 1 to 3 hydrogens are replaced by a halo group, particularly a bromo or a chloro group; and R' is a aliphatic radical, viz, an alkyl group having from 1 to 18 carbon atoms, preferably, from 6 to 12; an alkenyl group having from 3 to 18 carbon atoms, or an alkynyl group or substituted alkynyl group as defined in R above. Additionally, R' may be an alicyclic radical, viz., a cycloalkyl group having from 3 to 14 carbon atoms.

R' may also be a substituted aliphatic and alicyclic radical. For example, the alkyl, alkenyl and cycloalkyl groups may contain one to six or more halo groups, particularly chloro or bromo and the alkynyl group may be substituted with one to three halo groups, particularly chloro or bromo.

Certain of the above compounds are new compositions of matter, namely, where R is an unsubstituted or halo-substituted cycloalkyl, alkenyl or alkynyl group and R' is an alkynyl or halosubstituted alkynyl group. Additionally, the unsubstituted and halosubstituted alkyl haloalkynyl sulfites have not been known materials. For these compounds the number of carbon atoms and the halosubstitutions are as defined above.

Examples of the sulfites of the invention, and their boiling points and sulfur analysis (where available) are shown in the following tables:

TABLE A.—ALKYNYL ALKYL SULFITES

|  | Boiling Point, ° | Sulfur Analysis | |
| --- | --- | --- | --- |
|  |  | Calcd. | Found |
| Propargyl methyl sulfite | 55–75 (3.0 mm.) |  |  |
| Propargyl ethyl sulfite | 30–35 (0.5 mm.) | 21.63 | 21.51 |
| Propargyl n-propyl sulfite | 59–61 (2.5 mm.) | 19.78 | 19.21 |
| Propargyl isopropyl sulfite |  |  |  |
| Propargyl n-butyl sulfite | 48–52 (0.15 mm.) | 18.19 | 17.49 |
| Propargyl isobutyl sulfite | 65–68 (2.5 mm.) | 18.19 | 17.85 |
| Propargyl n-amyl sulfite | 83–87 (0.2 mm.) | 16.88 | 16.85 |
| Propargyl n-hexyl sulfite | 95–99 (0.45 mm.) | 15.7 | 15.56 |
| Propargyl n-heptyl sulfite | 80–82 (0.45 mm.) | 14.67 | 14.50 |
| Propargyl n-octyl sulfite | 120–125 (0.4 mm.) | 13.78 | 13.89 |
| Propargyl 2-octyl sulfite | 87–90 (0.35 mm.) | 13.78 | 13.18 |
| Propargyl 2-ethylhexyl sulfite | 85–87 (0.15 mm.) | 13.78 | 13.36 |
| Propargyl 2,2,4-trimethylpentyl sulfite | 78–81 (0.15 mm.) | 13.78 | 13.52 |
| Propargyl n-nonyl sulfite | 101–103 (0.2 mm.) | 13.03 | 12.78 |
| Propargyl n-decyl sulfite | 113–115 (0.1 mm.) | 12.31 | 12.26 |
| Propargyl 2-decyl sulfite | 90–98 (0.3 mm.) |  |  |
| Propargyl n-undecyl sulfite | 135–141 (0.8 mm.) | 11.68 | 11.69 |
| Propargyl 5-ethyl-2-nonyl sulfite | 116–121 (0.25 mm.) | 11.68 | 11.38 |
| Propargyl n-dodecyl sulfite | 125–130 (0.25 mm.) | 11.11 | 11.60 |
| Propargyl 2-butyloctyl sulfite | 110–112 (0.15 mm.) | 11.11 | 10.63 |
| Propargyl n-tridecyl sulfite | 160–170 (1.2 mm.) | 10.60 | 9.89 |
| Propargyl n-tetradecyl sulfite | 147–154 (0.2 mm.) | 10.02 | 10.29 |
| Propargyl n-hexadecyl sulfite | 182–188 (0.5 mm.) | 9.32 | 9.57 |
| Propargyl n-octadecyl sulfite | 203–211 (1.0 mm.) | 8.60 | 8.87 |
| 2-(3-butynyl) isobutyl sulfite | 57–60 (0.75 mm.) |  |  |
| 2-(3-butynyl) n-decyl sulfite | 115–124 (0.1 mm.) | 11.68 | 11.40 |
| 2-(3-butynyl) n-hexadecyl sulfite |  |  |  |
| 1-(2-butynyl) n-octyl sulfite | 109–114 (0.15 mm.) |  |  |
| 1-(2-butynyl) tridecyl sulfite | 146–152 (0.3 mm.) | 10.13 | 10.24 |
| 2-methyl-2-(3-butynyl) n-decyl sulfite | 129–137 (0.35 mm.) | 11.12 | 11.93 |
| 1-(3-butynyl) n-octyl sulfite |  |  |  |
| 1-(3-hexynyl) n-hexyl sulfite |  |  |  |
| 1-(2-heptynyl) n-butyl sulfite |  |  |  |
| 1-(3-nonynyl) n-hexyl sulfite |  |  |  |
| 1-(6-dodecynyl) methyl sulfite |  |  |  |

TABLE B.—HALO-ALKYNYL ALKYL SULFITES

|  | Boiling Point, ° | Sulfur Analysis | |
| --- | --- | --- | --- |
|  |  | Calcd. | Found |
| 1-(4-chloro-2-butynyl) methyl sulfite | 77–79 (0.15 mm.) | 17.56 | 18.56 |
| 1-(4-chloro-2-butynyl) n-butyl sulfite | 105–108 (0.4 mm.) | 14.27 | 15.08 |
| 1-(4-chloro-2-butynyl) n-hexyl sulfite | Above 55 (1.0 mm.) | 12.68 | 12.82 |
| 1-(4-chloro-2-butynyl) n-octyl sulfite | 138–143 (0.2 mm.) | 11.44 | 11.45 |
| 1-(4-chloro-2-butynyl) n-decyl sulfite | 145–156 (1.2 mm.) |  |  |
| 1-(4-chloro-2-butynyl) n-dodecyl sulfite | 178–182 (0.4 mm.) | 9.52 | 8.82 |

TABLE C.—ALKYNYL CYCLOALKYL SULFITES

| | Boiling Point, ° | Sulfur Analysis | |
|---|---|---|---|
| | | Calcd. | Found |
| Propargyl cyclohexyl sulfite | 90–98 (1.5 mm.) | 15.81 | 16.01 |
| Propargyl 2-methyl cyclohexyl sulfite | 93–109 (0.04 mm.) | | |
| Propargyl cyclooctyl sulfite | 109–116 (0.5 mm.) | | |
| Propargyl 2-cyclohexyl-cyclohexyl sulfite | Above 130 (0.25 mm.) | 11.28 | 10.52 |
| Propargyl 4-t-butylcyclohexyl sulfite | | | |
| Propargyl cyclopentyl sulfite | | | |
| 1-(2-butynyl) cyclohexyl sulfite | | | |
| 1-(4-chloro-2-butynyl) cyclohexyl sulfite | | | |
| Propargyl 4-methylcyclohexyl-methyl sulfite | 99–103 (0.2 mm.) | 13.95 | 13.46 |

TABLE D.—ALKYNYL HALOALKYL SULFITES

| | Boiling Point, ° | Sulfur Analysis | |
|---|---|---|---|
| | | Calcd. | Found |
| Propargyl 2-chloroethyl sulfite | 78–82 (0.3 mm.) | 17.56 | 17.11 |
| Propargyl 4-chlorobutyl sulfite | 92–97 (0.2 mm.) | 15.22 | 15.21 |
| 2-butyn-1,4-bis(2-chloroethyl sulfite) | Above 57 (1.0 mm.) | 18.88 | 18.06 |
| 1-(4-chloro-2-butynyl-2-chloroethyl sulfite) | 140–150 (1.8 mm.) | 13.87 | 13.80 |
| Propargyl 2-chlorocyclohexyl sulfite | 108–112 (0.25 mm.) | 13.54 | 13.93 |
| Propargyl 2,3-dichloropropyl sulfite | | | |
| Propargyl trichloropropyl sulfite | | | |
| Propargyl 2-chlorooctyl sulfite | | | |
| Propargyl 6,7-dibromo-3,7-dimethyloctyl sulfite | Above 105 (0 mm.) | | |
| 1-(4-chloro-2-butynyl) chlorodecyl sulfite | | | |
| 1-(4-chloro-2-butynyl) 6,7-dibromo-3,7-dimethyloctyl sulfite | Above 108 (0.4 mm.) | | |

TABLE E.—ALKYNYL ALKYENYL SULFITES

| | Boiling Point, ° | Sulfur Analysis | |
|---|---|---|---|
| | | Calcd. | Found |
| Propargyl allyl sulfite | | | |
| Propargyl 1-(3-butenyl) sulfite | 55–59 (0.5 mm.) | 18.41 | 17.51 |
| Propargyl 1-(2-butenyl) sulfite | | | |
| Propargyl 3,7-dimethyl-6-octenyl sulfite | 126–135 (4.0 mm.) | | |
| Propargyl 1-(3-hexenyl) sulfite | 73–75 (0.35 mm.) | 15.81 | 16.45 |
| Propargyl ω-undecenyl sulfite | 123–132 (0.35 mm.) | 11.77 | 11.84 |
| 1-(4-chloro-2-butynyl) ω-undecenyl sulfite | 151–159 (0.25 mm.) | 9.99 | 9.47 |
| 2-(3-butynyl) 1-(2-propenyl) sulfite | | | |

TABLE F.—DIALKYNYL SULFITES

| | Boiling Point, ° | Sulfur Analysis | |
|---|---|---|---|
| | | Calcd. | Found |
| Dipropargyl sulfite | 105–108 (18 mm.) | 20.26 | 20.90 |
| Propargyl 2-(3-butynyl) sulfite | | | |
| 1-(4-chloro-2-butynyl) hexynyl sulfite | | | |
| bis[1-(4-chloro-2-butynyl)] sulfite | | | |
| bis[1-(2-butynyl)] sulfite | | | |

The sulfate diesters may be conveniently prepared by reacting thionyl chloride with the appropriate alcohols:

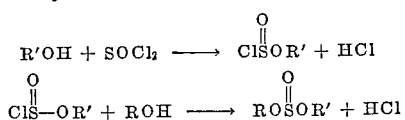

For details of this preparation see our U.S. Patent 3,179,684, the teaching of which is incorporated herein by reference.

The sulfite nematocide can be used together with solid carrier such as clay-type granules or as liquids in the form of emulsifiable concentrates. A typical emulsifiable concentrate would contain about 70% of the active compound, 15% emulsifier and 15% solvent monochlorobenzene. Six pounds of such concentrate has a total volume of about one gallon and is diluted in water to give the desired amount of chemical per acre. Broadly, from 5 to 500 pounds of the sulfite should be applied per acre of soil, preferably, from 50 to 250 pounds, depending on such conditions as the type of soil and degree of the infestation of the crop.

In the case of anthelmintic usage, the dosage is limited by the toxicity of the particular animal being treated. This may be determined by means of a conventional toxicity probe.

To show the efficacy of the compounds of the invention, the following test procedures were employed:

Nematocide testing methods

The ability of the chemicals to control nematodes was evaluated by employing the following testing techniques:

Procedure #1 (contact test)

Three hundred milligrams chemical is dissolved in 10 ml. of acetone. Ninety milligrams (three drops from a standard medicine dropper) of this 3.0% solution is added to a BPI (Bureau of Plant Industry) standard watch glass containing 150 mg. of a 0.01% solution of Triton X–100 (five drops) in distilled water. Thirty milligrams (1 drop) of a nematode suspension containing 50–100 live *Panagrellus redivivus* nematodes is added to the watch glass containing the chemical preparation. The final concentration of chemical in the BPI watch glass is 1.0% (10,000 p.p.m.). The test is conducted in duplicate using a dilution series. An untreated check, i.e. two watch glasses containing 0.01% Triton X–100 solution and nematodes but no chemical, is included in the test. The watch glasses are placed in 100 x 15 mm. inverted Petri plates and sealed with water to avoid evaporation. The test is kept in the laboratory at room temperature. The results are taken by microscopic inspection of the nematodes in the watch glasses. They are recorded as percent nematode control by contact after 48 hours.

Procedure #2 (fumigant test)

One drop of a nematode suspension containing 50–100 live *Panagrellus redivivus* nematodes is placed in each of two BPI watch glasses. An additional drop of distilled water is added to the watch glasses to avoid drying out of the nematode culture. Thirty milligrams (1 drop) chemical is added to a third BPI watch glass. This and the two watch glasses containing the nematodes are placed in an inverted Petri plate which is sealed with water. An untreated control, i.e. two watch glasses alone containing nematodes, is placed in the water sealed Petri plates. The test is kept at room temperature and examined after 48 hours by microscopic inspection. The results are recorded as percent nematode control by fumigation.

Procedure #3 (contact pot test)

250 milligrams of chemical is mixed with 60 mg. of wetting agent such as Atlox G-2081 and suspended with 125 ml. distilled water. This chemical suspension is added to and manually mixed with 4.5 pounds of sandy soil severely infested with root-knot nematodes of the genus Meloidogyne. This amount of chemical is equivalent to a rate of 125 p.p.m. or 250 lbs./acre based on the weight of an acre of soil 6" deep being 2,000,000 pounds. The treated 4.5 pounds of infested soil is filled into three four-inch post, placed on saucers in the greenhouse and watered by subirrigation. Three pots with infested soil but without the chemical treatment are included. Also included in the test are three 4" pots containing sterilized soil without a chemical treatment. Two weeks later a tomato seedling is planted in each treated and untreated pot. The test is kept in the greenhouse and watered regularly by subirrigation. Five weeks later the tomato roots are inspected for galls caused by the root-knot nematodes. The results are recorded in percent control.

In order to illustrate the instant invention the following examples are given:

EXAMPLE I

The following table shows the results obtained with various alkyl propargyl sulfites, using test procedure #1:

TABLE I

| Alkyl Group, R': | Percent control at p.p.m. | | |
|---|---|---|---|
| | 10 | 100 | 1,000 |
| n-Propyl | | 17.5 | 99.5 |
| n-Hexyl | 3 | 100 | 100 |
| n-Octyl | 78 | 100 | 100 |
| n-Decyl | 75 | 100 | 100 |
| Dodecyl | 97 | 100 | 100 |

The above table shows the marked effect of the alkyl alkynyl sulfites of the invention. In the case of the propargyl compounds, i.e., compounds wherein R is

HC≡CCH$_2$— the higher molecular weight materials are more effective at low concentrations.

EXAMPLE II

The following are additional compounds which show 95% or higher control of the Panagrellus sp. at 10,000 p.p.m. in the contact test (Procedure #1):

propargyl methyl sulfite
propargyl ethyl sulfite
propargyl isobutyl sulfite
propargyl n-amyl sulfite
propargyl n-heptyl sulfite
propargyl 2-methylcyclohexyl sulfite
propargyl 2-octyl sulfite
propargyl 2-ethylhexyl sulfite
propargyl "iso" octyl sulfite[1]
propargyl 4-methylcyclohexylmethyl sulfite
propargyl cyclooctyl sulfite
propargyl n-nonyl sulfite
propargyl n-undecyl sulfite
propargyl hexadecyl sulfite
propargyl β-chloroethyl sulfite
2-(3-butynyl) isobutyl sulfite
2-(3-butynyl) n-decyl sulfite
2-methyl-2-(3-butynyl) n-decyl sulfite
dipropargyl sulfite
propargyl ω-undecenyl sulfite
propargyl 1-(3-butenyl) sulfite
propargyl 1-(3-hexenyl) sulfite

[1] The "iso" compounds in the above table refer to groups derived from the commercially available isooctyl alcohol (Enjay) and isodecylcellosolve (Union Carbide).

EXAMPLE III

Again using test procedure #1, the following compounds were shown to be effective at the concentrations indicated:

| Compound | P.p.m. | Percent control |
|---|---|---|
| 1-(4-chloro-2-butynyl) n-hexyl sulfite | 100 | 100 |
| 1-(4-chloro-2-butynyl) methyl sulfite | 100 | 90 |
| 1-(4-chloro-2-butynyl) n-decyl sulfite | 100 | 100 |
| 1-(4-chloro-2-butynyl) n-butyl sulfite | 100 | 95 |
| 1-(4-chloro-2-butynyl) ω-undecenyl sulfite | 100 | 98 |
| 1-(4-chloro-2-butynyl) n-octyl sulfite | 100 | 100 |
| 1-(4-chloro-2-butynyl) 2-chloroethyl sulfite | 100 | 100 |
| 1-(4-chloro-2-butynyl) 3,7-dimethyl-6,7-dibromo-octyl sulfite | 1,000 | 99 |

EXAMPLE IV

The following results were obtained in the fumigant test (Procedure #2):

Compound:

| | Percent control of Panagrellus after 48 hours |
|---|---|
| Propargyl methyl sulfite | 100 |
| Propargyl ethyl sulfite | 100 |
| Propargyl n-propyl sulfite | 100 |
| Propargyl isobutyl sulfite | 100 |
| Propargyl n-amyl sulfite | 100 |
| Propargyl n-hexyl sulfite | 100 |
| Propargyl n-heptyl sulfite | 100 |
| Propargyl n-octyl sulfite | 100 |
| Propargyl 2-octyl sulfite | 99 |
| Propargyl 2-ethylhexyl sulfite | 90 |
| Propargyl "iso" octyl sulfite | 100 |
| Propargyl 2,2,4-trimethylpentyl sulfite | 80 |
| Propargyl 4-methylcyclohexylmethyl sulfite | 100 |
| Propargyl n-nonyl sulfite | 100 |
| 2-(3-butynyl) isobutyl sulfite | 100 |
| Dipropargyl sulfite | 100 |
| Propargyl 1-(3-butenyl) sulfite | 100 |
| Propargyl 1-(3-hexenyl) sulfite | 100 |

EXAMPLE V

The following results were obtained in the pot test (Procedure #3):

| Compound | Percent control of root-knot nematodes lbs./acre | |
|---|---|---|
| | 250 | 62 |
| Propargyl n-amyl sulfite | 100 | |
| Propargyl n-hexyl sulfite | | 100 |
| Propargyl n-heptyl sulfite | | 100 |
| Propargyl n-octyl sulfite | | 100 |
| Propargyl "iso" octyl sulfite | | 95 |
| Propargyl 4-methylcyclohexyl-methyl sulfite | 100 | 95 |
| Propargyl n-decyl sulfite | 100 | |
| Propargyl n-dodecyl sulfite | 83 | |
| Dipropargyl sulfite | 100 | 94 |
| Propargyl 1-(3-hexenyl) sulfite | 90 | |

EXAMPLE VI

The following example shows the effect of the compounds of the invention as anthelmintics in mice.

Anthelmintic screening test

The Parasite: *Nemotospiroides dubius*—(Nemotode) larval stage.

The Host: Swiss-Webster male albino mice, 18–22 gm. body weight.

Route of infection: Oral-Gavage. Approximately 20 larvae per mouse, suspended in 0.5 ml. physiological saline.

Route of treatment: Oral-Gavage.

A. Toxicity probe: The compound was subjected to an oral toxicity probe. The purpose was to establish an oral dose level which, when introduced two times daily on two successive days, does not kill the 18–22 gm. male albino mice for 1 week.

Different mouse groups were instomated with 2,000, 1,000 and 500 mg./kg. body weight of each agent. The concentrations of agent were delivered in 0.5 ml. to a 20 gm. mouse and the volume was increased or decreased depending on the body weight, so that the agent:body weight ratio remained constant. The agents were suspended and homogenized in a methylcellulose vehicle.

B. Infections: Sixty male albino mice were infected with approximately 20 *Nematospiroides dubius* larvae each. The larvae were suspended in saline and stomach tubed in a volume of 0.5 ml. each. The mice were housed individually and on the 12th day after infection fecal pellets were collected from each mouse, individually. The pellets were incubated in Petri dishes on moist paper, at room temperature. On day 7 after infection, each dish was examined for larvae and it was established that 100% mouse infection had been achieved.

The test groups, comprised of 5 mice per group, were as follows:

Infection control—infected; no treatment.
Vehicle control—infected; treated exactly as the test group, except that only the methylcellulose vehicle was instomated.
Anthelmintic control—infected; treated twice daily, for one day with carbon tetrachloride at 2,000 mg./kg., in milk.
Test groups—infected; treated twice daily for two consecutive days with the candidate compound.

The treatment, in all cases, commenced on the 14th day after infection. Fecal samples were collected on the 6th day after treatment commenced. This will have permitted enough time for flushing out of the parasites and residual eggs, if a compound is effective. The stools were incubated in Petri dishes on moist paper. Seven days later the plates were examined for larvae. The presence of larvae indicated the persistence of eggs and thus the failure of the compound to have destroyed or flushed out the parasite.

Results

The oral toxicity probe suggested that the following concentrations of test compound could be used in the actual assay.

Compound: Estimated maximum tolerable dose, mg./kg.
Propargyl dodecyl sulfite _____ 200

The results of the drug assay are presented below in Table VI. All mice were established as having been infected prior to treatment.

TABLE VI

The Effectiveness of Propargyl Dodecyl Sulfite Against *N. dubius*.

| Compound | Each Dose, mg./kg. | Times Daily | No. Days | Surv.[1] Mice, day | Percent Persisting | |
|---|---|---|---|---|---|---|
| | | | | | Larvae [2] | Parasite [3] |
| Propargyl dodecyl sulfite | 200 | 2 | 2 | 3 | 0 | 0 |
| Carbon tetrachloride | 2,000 | 2 | 1 | 2 | 0 | 0 |
| Methylcellulose | | 2 | 2 | 4 | 100 | 100 |
| Infection control | | | | 3 | 100 | 100 |

[1] Indicates number of mice surviving on the seventh day after treatment commenced. Fecal pellets were collected and cultured from each mouse and then the mice were autopsied.
[2] The larvae column indicates the percentage of mice still shedding eggs which become larvae. The 100% figure indicates that all mice still produced eggs and hence the compound was ineffective under the conditions of this test.
[3] The *Parasite* column indicates the percentage of mice which exhibited intestinal worms, mature, upon autopsy.

The carbon tetrachloride run serves as anthelmintic control and the methylcellulose as vehicle control. All of mice yielded larvae and exhibited parasites in the methylcellulose run. Neither larvae nor mature intestinal parasites were found in the propargyl dodecyl sulfite or the carbon tetrachloride run.

The above data show that the chemicals of the invention, as illustrated by the effectiveness of propargyl dodecyl sulfite, are effective nematocides in animals.

Having thus described our invention, what we claim and desire to protect by Letters Patent is:

1. The method of controlling nematodes which comprises contacting nematodes with a mixted sulfite diester of an acyclic alkynyl alcohol and an aliphatic alcohol or cycloaliphatic alcohol.

2. The method of controlling nematodes which comprises contacting said nematodes with a compound represented by the formula:

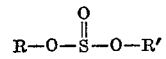

in which R is an unsubstituted or halo-substituted alkyl, a cycloalkyl, alkenyl, or alkynyl group, and R' is an alkynyl or halo-substituted alkynyl radical.

3. The method of claim 2 wherein the compound is a propargyl alkyl sulfite.

4. The method of claim 3 wherein the alkyl group has from 1 to 18 carbon atoms.

5. The method of claim 2 wherein the compound is a 1-(2-butynyl) alkyl sulfite.

6. The method of claim 2 wherein the compound is propargyl n-decyl sulfite.

7. The method of claim 2 wherein the compound is propargyl n-octyl sulfite.

8. The method of claim 2 wherein the compound is bis-propargyl sulfite.

9. The method of claim 2 wherein the compound is propargyl n-hexyl sulfite.

10. The method of claim 2 wherein the compound is propargyl n-dodecyl sulfite.

11. A compound having the formula:

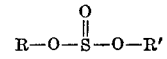

wherein R is an unsubstituted or halosubstituted cycloalkyl, alkenyl or alkynyl group and R' is an alkynyl or halo-substituted alkynyl group.

12. A compound of the formula

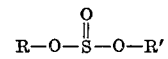

wherein R is alkyl or haloalkyl and R' is haloalkynyl.

References Cited

UNITED STATES PATENTS

| | | | |
|---|---|---|---|
| 2,820,808 | 1/1958 | Harris et al. | 260—456 |
| 3,179,684 | 4/1965 | Covey et al. | 260—456 |
| 3,179,686 | 4/1965 | Covey et al. | 260—456 |
| 3,179,687 | 4/1965 | Covey et al. | 260—456 |

LEWIS GOTTS, *Primary Examiner.*

S. K. ROSE, *Assistant Examiner.*

U.S. Cl. X.R.

260—456